Sept. 19, 1933.    H. E. BLOOD ET AL    1,927,484
SHIFT MECHANISM
Original Filed Feb. 1, 1929    3 Sheets-Sheet 1
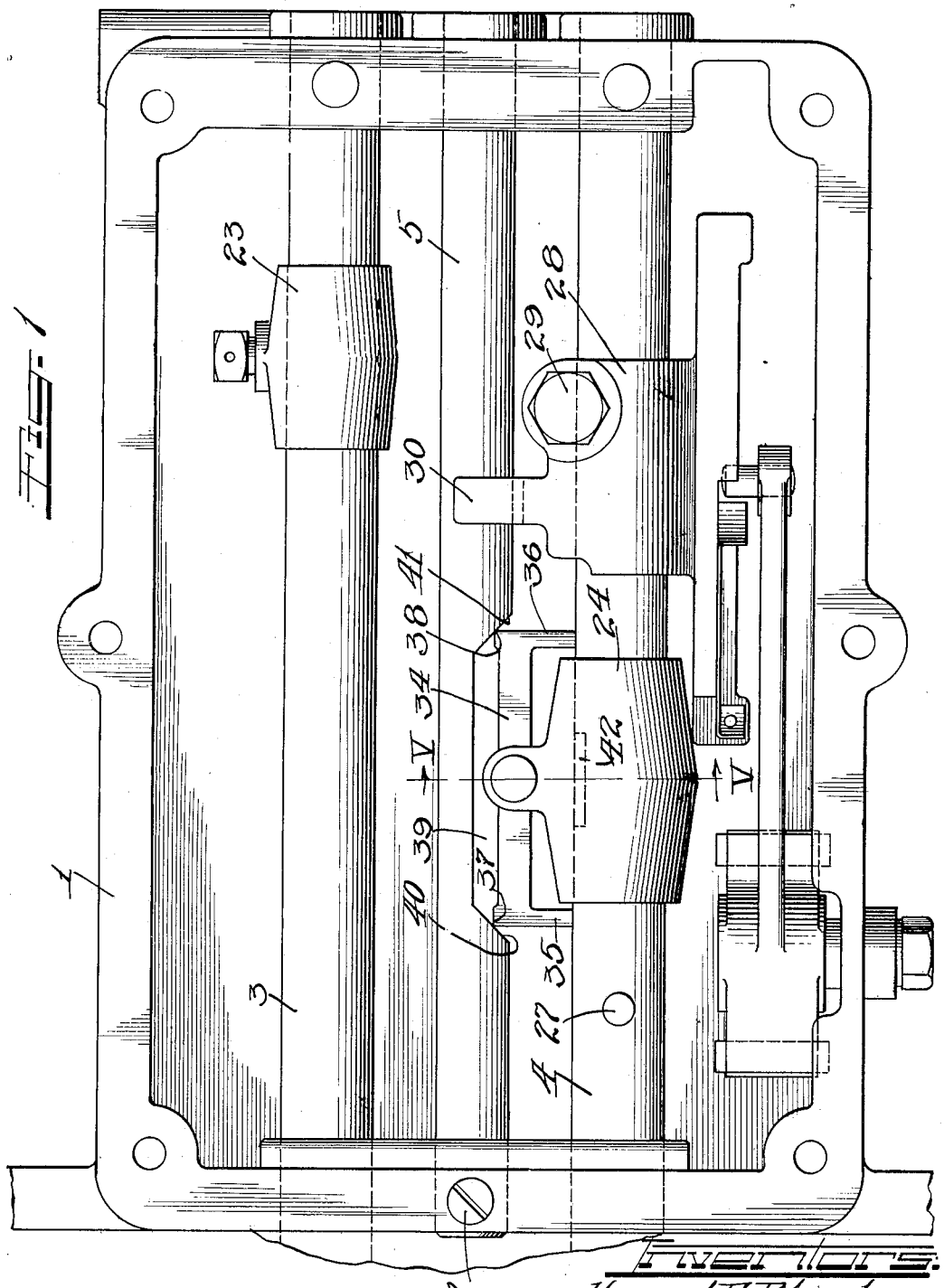

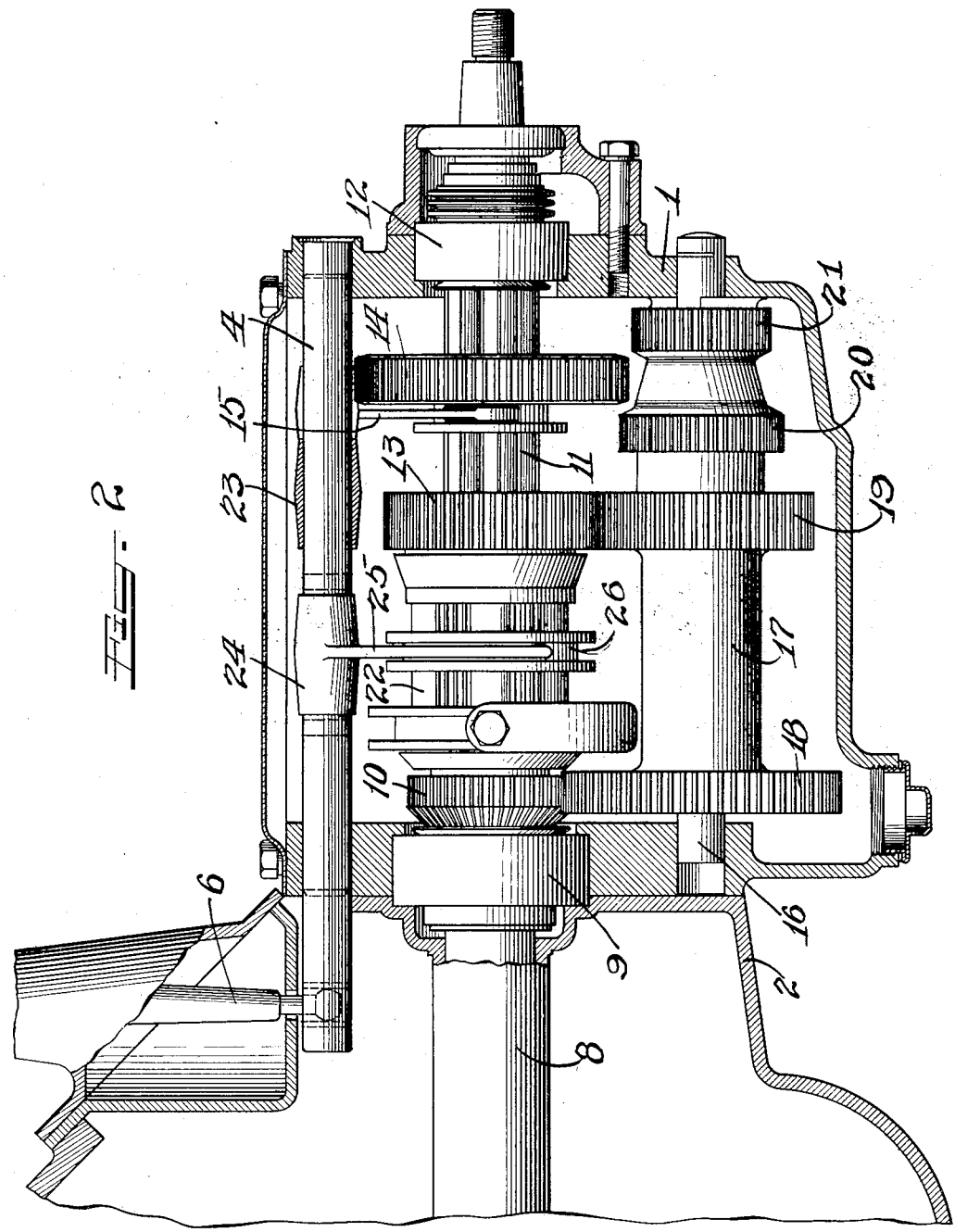

Sept. 19, 1933.    H. E. BLOOD ET AL    1,927,484
SHIFT MECHANISM
Original Filed Feb. 1, 1929    3 Sheets-Sheet 3
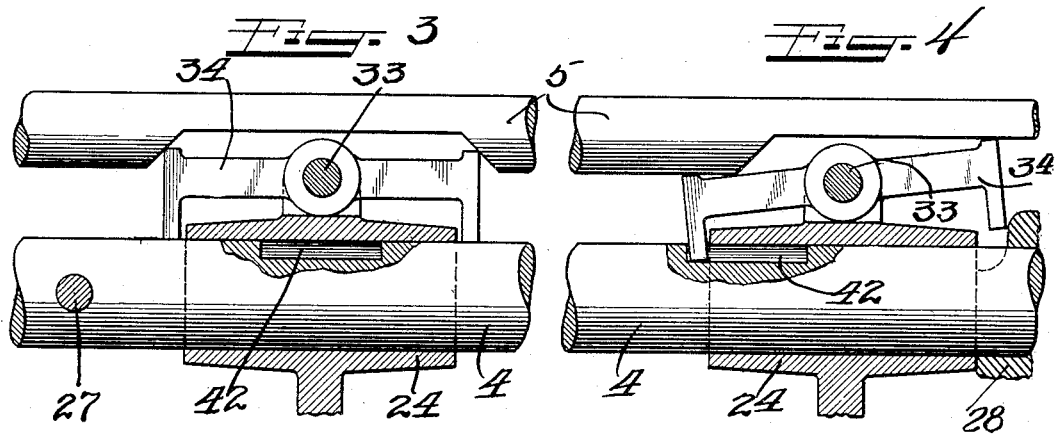
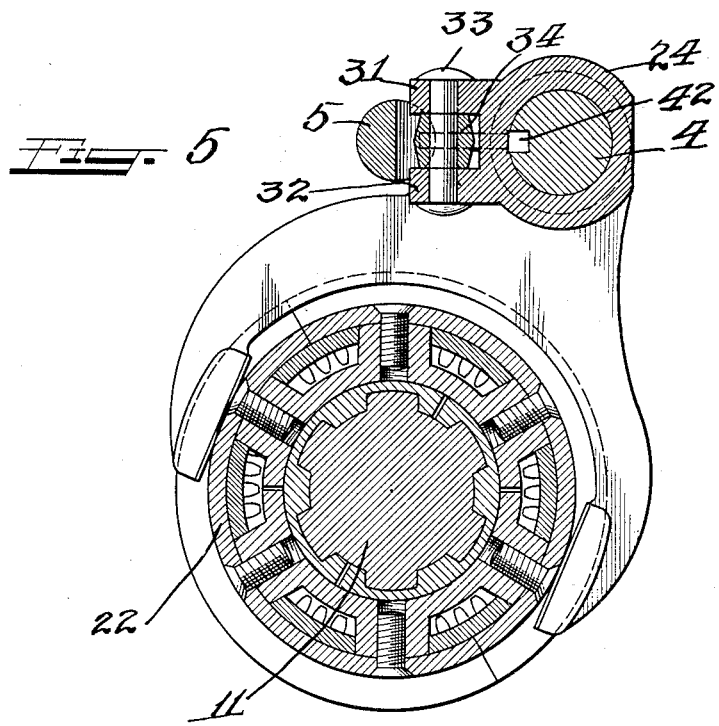
Inventors:
Howard E. Blood
John C. Buchanan
Robert L. Mapson
by Charles ... Attys.

Patented Sept. 19, 1933

1,927,484

UNITED STATES PATENT OFFICE 1,927,484

SHIFT MECHANISM

Howard E. Blood and John C. Buchanan, Detroit, Mich., and Robert L. Mapson, Kokomo, Ind., assignors to Detroit Gear & Machine Company, Detroit, Mich., a corporation of Michigan Original application February 1, 1929, Serial No. 336,779. Divided and this application December 23, 1929, Serial No. 415,919. Renewed May 10, 1933

15 Claims. (Cl. 74—39)

This invention relates to a shift mechanism suitable for a variable speed transmission such as is used in motor vehicles and which includes shifter rods and forks, and particularly to an interlock for a gear shifter wherein the shifter fork is loose on the shifter rod but is locked against accidental displacement when the shifter rod itself is stationary.

An object of the invention is to provide a novel interlock for gear shifters of transmissions which allows the shifter rod to move freely a predetermined distance before moving the gear shifter.

Another object of the invention is to provide a simple and efficient interlock for transmissions that will hold the gear shifter positively in position except when the gear shifter rod is moved.

Another object of the invention is to provide a simple and efficient interlock for gear shifters of transmissions that will allow the gear shifter rod to travel a predetermined distance before engaging the gear shifter to throw the gear into mesh but on reversing the motion of the shifter rod will immediately move the gear shifter to demesh the gear without lost motion.

A further object of the invention is to provide a simple and efficient interlock for a transmission gear shifter that will allow the gear shifter rod to travel a certain predetermined distance from its normal "neutral" position, unlock the gear shifter from its "neutral" position and move it into position to mesh the gears.

A still further object of the invention is to provide a simple and efficient interlock for transmission gear shifters that will allow the gear shifter rod to hold the gear shifter locked against movement when the gears are in mesh but on moving the gear shifter rod toward its "neutral" position will immediately act on the gear shifter to demesh the gears, lock the gear shifter in position when the gears are demeshed then move on to its own "neutral" position.

Another and yet further object of the invention is to provide a shift mechanism for power transmissions wherein a shiftable member is moved a certain distance for causing engagement of certain mechanism and then continued movement of the shiftable member causes engagement of other mechanisms.

According to the invention, the interlock contemplates a pivoted or rocker bar on a shifter fork cooperating with a fixed member for rocking the bar into locking position whenever the shifter fork and rod is moved to shifted position.

The above, other and further objects of the invention will be apparent from the following description, accompanying drawings and appended claims.

This application is a dvision of copending application Serial No. 336,779, filed February 1st, 1929.

An embodiment of the invention is illustrated in the accompanying drawings and the views thereof are as follows:

Figure 1 is a top plan view of a transmission or gear shift mechanism embodying the present invention.

Figure 2 is a vertical central section through a transmission or gear shift provided with an embodiment of the present invention and showing certain parts in elevation and other parts in section.

Figure 3 is a top plan view partially in section of the interlock showing the arrangement of parts when the gears are in neutral position.

Figure 4 is a view similar to Figure 3 showing the interlock in locking position when a gear is in mesh with other gears in the transmission for driving purposes.

Figure 5 is a section taken substantially on line V—V of Fgure 1.

The drawings will now be explained.

The mechanism chosen to exemplify the present invention shows a gear shift mechanism or transmission having three speeds forward and one reverse.

Figure 1 shows a top plan of a transmission casing 1 with the top plate removed which is supported in any convenient manner with respect to the engine. Figure 2 illustrates a fragmental portion of the engine casing 2 to which is attached the transmission casing 1 in the usual manner.

The transmission casing 1 as illustrated contains two shifter rods 3 and 4 and a fixed guide rod 5.

The shifter rod 3 in the present embodiment of the invention actuates the sliding gear for the first speed forward and for reverse, while the shifter rod 4 actuates the sliding gear for second speed forward and high speed forward.

The shifter rods 3 and 4 are operated selectively in the usual manner by gear shift lever 6 a portion of which is illustrated in Figure 2.

The shifter rods 3 and 4 are movable axially in both directions in the transmission casing 1 while the guide rod 5 is fixed in the casing in any suitable manner, such for instance, as by a screw 7.

Figure 2 illustrates a portion of the engine shaft 8 supported in a bearing 9 in the casing and which shaft has integrally formed therewith a high speed gear 10.

The main shaft 11 of the transmission or gear shift housing is illustrated as one having splines thereon although of course it may be rectangular, triangular or any other suitable shape for driving the various gears carried by the same.

The main shaft 11 is supported in the rear of the transmission housing or casing 1 by means of a ball bearing 12.

The second speed gear 13 is supported on the main shaft 11 on a flanged member not shown which is broached to cooperate with the splines on the main shaft 11.

The first speed gear 14 is carried by the main shaft 11 and is broached so as to rotate with said shaft in the usual manner.

A shifter fork 15 is operatively associated with the first speed gear 14 for moving it axially on the main shaft 11 to selectively engage the first speed forward or reverse gear on the countershaft.

The countershaft 16 is supported by the transmission housing 1 and supports by the usual bearings not shown a countershaft gear member 17 carrying a gear 18 which is in mesh at all times with high speed gear 10 on the engine shaft 8, an intermediate gear 19 in mesh with the second speed gear 13 on the main shaft 11 of the transmission, and a first speed forward gear 20 together with a reverse gear 21 which is selectively connected with the gear 14 on the main shaft 11 by an idler gear not shown.

The second and high speed gears 13 and 10 respectively are operatively connected by means of a clutch mechanism shown at 22 and which is fully explained in our copending application.

The shifter fork 15 associated with the first speed sliding gear 14 is carried by a hub 23 on shifter rod 3.

A hub 24 on shifter rod 4 carries a shifter fork 25 associated with a shifter ring 26 of the clutch mechanism 22 for selectively meshing the second speed gear 13 or the high speed gear 10. The hub 24 is slidable on the shifter rod 4. A pin 27 extends through the shifter rod 4 on one side of the hub 24 while another hub 28 is clamped to the shifter rod 4 on the other side of the hub 24 by means of a clamp nut 29 which hub carries a projecting finger 30 engaging the fixed rod or member 5 to prevent rotation of the shifter rod 4 as the same is moved in use.

The hub 24 is provided with lateral ears 31 and 32 which ears are apertured to receive a bolt, rivet or other suitable pivot pin 33.

The interlock of the present invention is illustrated as including a rocking bar or pivoted member 34 which is pivoted intermediate its ends to the pivot pin 33 carried by the hub 24. The bar 34 has legs 35 and 36 extending toward and when in neutral position resting against the shifter rod 4. It may be observed in Figures 1 and 3.

The rocker bar 34 is provided with shoulders 37 and 38 extending in opposite directions from the legs 35 and 36 respectively a slight distance beyond the outer margin of the bar.

The fixed member 5 is provided with a recess 39 having outwardly inclined ends 40 and 41.

The arrangement of the parts is such that when the gears are in neutral position the rocking bar 34 will lie within the recess 39 of the fixed member 5 with the shoulders 37 and 38 thereof in contact with the diverging ends 40 and 41 of said recess and in which position the legs 35 and 36 rest against the shifter bar 4.

The shifter bar 4 is provided with an elongated notch 42 arranged in alignment with the ends of the legs 35 and 36 of the rocker bar 34 but is shorter than the length of the rocker bar.

The interlock is shown in connection with the hub for the shifter fork for the second and third speeds only. It is of course understood that a similar interlock could be provided for the hub 23 carrying the shifter fork for the first speed forward and reverse gear if desired.

The operation of the interlock of this invention is as follows:

Assume that the motor vehicle in which a transmission embodying the present invention is installed has started and it is desired to go into third speed which is accomplished by moving the hub 24 to the left as viewed in Figures 1, 3 and 4 of the drawings.

The gear shift 6 is actuated to engage the shifter rod 4 in a manner to move it to the left to selectively engage the high speed gear. Initial movement of the rod to the left will not actuate the hub 24 as the hub is free on the rod. Movement of the rod 4 to the left will thereupon move the hub 28 to the left a distance equal to the space between the hubs 24 and 28. The moment the hub 28 engages against the adjacent end of the hub 24, it will move the hub 24 to the left carrying with it the rocker arm 34. Movement of the rocker arm 34 to the left will, because of the engagement of the shoulder 37 thereof against the inclined end 40 of the recess 39 in the fixed member 5, tend to rock the arm 34 in counterclockwise direction. The parts are so arranged that when the rocker arm begins to rock, the notch 42 in the rod 4 will be underneath the leg 35 of said rocker arm to allow the end of said leg to enter the notch. Continued movement of the shifter rod to effect clutching engagement with the high speed gear continues until such clutching is effected whereupon the left end of the rocker arm 34 as viewed in the drawings will have moved to the left of the inclined end 40 of the recess 39 in the fixed member 5 with the end of the leg 35 in the notch 42 of the rod 4. In this position, the hub of the shifter fork 24 is confined with slight clearance between the hub 28 and the end 35 of the rocker arm 34 since the rocker arm 34 is held depressed by the shoulder 37 bearing against the stationary member 5. This end is positioned on the parts for the high speed drive.

When the gears are to be demeshed, the shifter rod 4 is moved in the opposite direction, to the right in Figure 4. Then since the end of the leg 35 of the rocker arm 34 is caught in the notch 42, the hub of the shifter fork 24 will be immediately forced to move the gears out of mesh (to the right in Figure 4). This movement of the hub 24 will continue until the shoulder or end 38 of the rocking member 34 strikes the inclined surface of the stationary member 41, for rocking it back to the position parallel with the shift rod 4. This action removes the end or shoulder 35 from the notch 42 and allows the shifter rod 4 to return to its normal "neutral" position, in which position the notch 42 is as shown in dotted lines in Figure 1 and in full lines in Figure 3.

Movement of the shifter rod 4 to the right for meshing the second speed gear allows the hub 24 to remain in neutral position until the pin 27 strikes the adjacent end of the hub 24 by which time the notch 42 will have cleared the opposite end 24 so that as the rocker bar 34 is moved to the right and depressed by the inclined end 41 of the recess 39 of the fixed member 5, the notch will be in position to receive the end of the leg 36 whereupon when the second speed gear is fully meshed the interlock will be effective for locking the gear against displacement until the shifter rod is moved with the parts arranged in opposite direction from that shown in Figure 4. The return to neutral is accomplished in the same manner as explained with reference to the high speed gear meshing but in the opposite direction.

It will be observed that the interlock of this invention is simple and efficient and one which because of its construction effectively locks the gear shift lever in shifted position in either direction. The parts are sturdy and so associated so as to continue in use for a long time with no danger of anything becoming injured or requiring replacement at frequent intervals.

The invention has been described herein as providing an interlock for a gear shifter lever to lock such lever in shifted position in either direction. The invention is susceptible of utilization for connecting a shifter member such as a shifter fork to an actuating rod for movement with such rod after said rod has had a predetermined travel with respect to said shifter member.

The invention has been described herein more or less precisely in detail, yet it is understood that the invention is not to be limited thereby as changes may be made in arrangement and proportion of parts and that equivalents may be substituted without departing from the spirit and scope of the invention.

We claim as our invention:

1. A gear set including adjacent members, a shifter fork slidably carried by one of said members, means for moving said fork, a rocking member associated with said fork, another of said adjacent members having a recess therein into which extends said rocking member for rocking said last named member when said fork is moved, and one of said members having a part engageable by said rocking member when the same is rocked for locking said shifter fork against accidental displacement.

2. A shift mechanism including parallel rods, one of which is fixed and the other of which is shiftable, a shifter fork slidably mounted on the shiftable rod, means for moving said shiftable rod, pivoted means carried by said shifter fork, said fixed rod having a recess in it engageable by said pivoted means to rock said pivoted means on the shifter fork to lock the shifter fork to said shiftable rod.

3. A shift mechanism including parallel rods, one of which is fixed and the other of which is shiftable, means for actuating said shiftable rod, a shifter fork loosely mounted on the shiftable rod, means on said rod for moving said fork, a pivoted member on said shifter fork, said shiftable rod having a recess in it engageable by the pivoted member on the shifter fork to permit the shifter fork to be moved into position to mesh the gears and to anchor the shifter fork to the shifter rod while the gears are being demeshed.

4. In a transmission gear shift set including a shiftable rod member and a shiftable fork member for moving a gear, said shiftable fork member being slidable on said rod, a mechanism for allowing the shifter rod member to slide freely a certain distance before moving the shiftable fork member to mesh the gear, said mechanism including a rocker on one shiftable member for locking engagement with the other shiftable member, and means for rocking said rocker into locking engagement with said other shiftable member as said shiftable members are moved.

5. In a device of the class described, a shiftable member, means for shifting said member, means movable on the shiftable member, a fixed member, and rocker means on the movable member engageable by the fixed member as said movable member is moved to move said rocker means into position to lock said movable member to the shiftable member for movement thereby after a predetermined movement of said shiftable member.

6. In a transmission mechanism including shifter forks and shifter rods, a rod having a recess therein, a shifter member slidable on said rod, a pivoted device carried by said slidable member and engageable with said recess to positively position said shiftable member with reference to certain positions of said rod, the relation of said shiftable member, pivoted member, and recess being such as to allow free movement of said shifter rod to predetermined limits without effecting change of position of said shiftable member, and means for rocking said pivoted member to engage said recess to lock said shiftable member to said rod.

7. A shift mechanism including a shifter rod, means for shifting said rod, a shifter fork loose on the rod, means on said rod for moving said fork, a pivoted member on said fork, a fixed member adjacent said rod having a recess therein, a recess in the shiftable rod to cooperate with said pivoted member and said shifter fork and to lock said shifter fork in a desired relation to said shifter rod.

8. In a power transmission mechanism wherein shiftable members are actuated to effect desired relationship of parts of the mechanism, including two parallel relatively movable rods, a shifter member loose on one rod, a rocker on said shifter member, said other rod having a recess in it with the ends of the recess inclined providing cam surfaces, said one rod having a notch in it engageable by said rocker under certain conditions, said rocker lying within said recess and free of the notch in said one rod when the shiftable members are in neutral position, initiation of movement of said one rod causing movement of said one rod relatively to the loose shiftable member thereon, said shiftable member being restrained against movement with said one rod by engagement of said rocker in a recess of said other rod and contact of said rocker with an adjacent surface of said one rod, continued movement of said one rod bringing its notch in register with an end of said rocker whereupon said rocker is moved into engagement with said notch by contact of that end of the rocker with a cam surface of the recess in said other rod, the engagement of said rocker with the notch in said one rod then causing movement of said loose shifter member with said one rod in its then direction of movement.

9. A shift mechanism including relatively shiftable parallel rods, means for shifting one of said rods, a shifter member loose on said one rod, a pivoted member on said shifter member, said one rod having a recess in it to cooperate with said pivoted member and said shifter member to lock said shifter member in a desired relation with said one rod, and another of said rods being provided with means for normally maintaining said pivoted member out of locking engagement with said one rod.

10. A shift mechanism including relatively shiftable parallel rods, means for shifting one of said rods, a shifter member loose on said one rod, a pivoted member on said shifter member, said one rod having a recess in it to cooperate with said pivoted member and said shifter member to lock said shifter member in a desired relation with said one rod to move said shifter member with said one rod, and another of said rods being provided with a recess for said pivoted member for normally maintaining said pivoted member out of locking engagement with said one rod.

11. A gear set including adjacent members, a shifter fork slidably carried by one of said members, means for moving said fork, a rocking member associated with said fork, another of said adjacent members having a recess therein into which extends said rocking member for rocking said last named member when said fork is moved, and one of said members having a part engageable by said rocking member when the same is rocked for locking said shifter fork for movement with its member.

12. A shifter mechanism for automotive vehicle transmissions, including adjacent relatively movable rods, a shifter member loose on one rod, a rocker on said shifter member, an adjacent one of said rods having a recess in it with the ends of the recess inclined providing cam surfaces, said one rod having a notch in it engageable by said rocker under certain conditions, said rocker lying within said recess and free of the notch of said one rod when said parts are in neutral position, said shifter member being restrained from movement with respect to the adjacent rod while said rocker remains in said recess and free of the notch in said one rod while permitting relative movement between said shifter member and said one rod, said shifter member being movable with respect to the adjacent rod and with said one rod when said rocker is in engagement with said notch in said one rod, said rocker being rocked into and out of engagement with said notch by said cam surfaces of said recess under certain conditions of relative movement of said rods, and means for moving said one rod.

13. In a transmission mechanism, in combination adjacent relatively movable rods, a shiftable member on one rod movable with and with respect to said one rod, said shiftable member being movable with respect to all of said rods, an adjacent one of said rods having a recess in it, a rocker on said shiftable member engageable with said recess, said one rod having a notch in it engageable under certain conditions by said rocker, said rocker lying within said recess and free of the notch when the parts are in neutral position, means for moving said one rod, the engagement of said rocker with said recess restraining relative movement of the shiftable member and said adjacent rod while permitting relative movement of the shiftable member and said one rod, movement of said one rod effecting engagement of the rocker with the notch whereupon said shiftable member is moved with said one rod and with respect to said adjacent rod, the movement of the rocker into engagement with said notch freeing said shiftable member from restraint of movement with respect to said adjacent rod.

14. In a transmission mechanism, in combination, adjacent relatively movable rods, a shiftable member on one rod movable with respect to said rods, rocker means on said shiftable member engageable with an adjacent one of said rods for restraining relative movement of said shiftable member and said adjacent rod, means effective by movement of said one rod for freeing said rocker from restrained engagement with said adjacent rod and for causing movement of said shiftable member with said one rod and with relation to said adjacent rod, and means for moving said one rod.

15. A shifter mechanism including parallel relatively movable bars, a slidable shifter member on one of said bars, means for moving said one bar, pivoted means carried by said shifter member, said one bar having means engageable by said pivoted means for locking said slidable shifter member to said one bar under certain conditions, another of said bars having an abutment formed thereon to be engaged by said pivoted means carried by said shifter member to rock said pivoted means on said shifter member into engagement with said means on said one bar to lock said shifter member to said one bar.

HOWARD E. BLOOD.
JOHN C. BUCHANAN.
ROBERT L. MAPSON.